Patented Jan. 28, 1930

1,744,981

UNITED STATES PATENT OFFICE

JAMES L. McCLELLAN, OF KENNETT SQUARE, PENNSYLVANIA, ASSIGNOR TO NATIONAL VULCANIZED FIBRE COMPANY, OF WILMINGTON, DELAWARE, A CORPORATION OF DELAWARE

METHOD OF PURIFYING ZINC CHLORIDE

No Drawing. Application filed April 13, 1927. Serial No. 183,621.

In certain industrial processes in which zinc chloride solutions are employed it is preferable that they be free from impurities such as ammonium chloride, ferric chloride, calcium and other chlorides, and also organic matter.

Generally in the manufacture of fibre board, known commercially as vulcanized fibre, thin sheets of cellulosic material are subjected to the action of zinc chloride in solution in water which may have a concentration value of from 68° to 73° Baumé. After having been subjected to the action of such solution heat and pressure are applied as steps in the completion of the process, but such steps and others as may be necessary are well known to those skilled in the art and constitute no part of the present invention, consequently they will not be given further consideration.

If there should be present in the solution in substantial quantities certain impurities it will be found that the said solution will not have its wanted or necessary action upon the said sheets of cellulose material; that is to say, the intensity of treatment or gelatinization will be diminished to such extent that the said sheets may not be of any commercial value for the purpose for which they were intended and it may become necessary to discard them, thereby causing waste and expense. Among the substances which constitute impurities of a character to prevent proper action of the zinc chloride solution upon the sheets of cellulosic material may be mentioned ammonium chloride, ferric chloride, calcium and sodium chlorides, and certain other salts, organic matter, and other impurities all of which have a tendency to render uncertain the action of the zinc chloride solution upon thin sheets of cellulose material. Hence it is desirable that the zinc chloride be as free as is practicable commercially from impurities in order that satisfactory results in the treatment may be assured.

If, for instance, the zinc chloride solution should contain more than one percent by weight of ammonium chloride or ferric chloride the presence thereof would act as an impurity to interfere with the proper action and effect of the solution upon the sheets of cellulosic material which might be treated thereby. In addition to ferric chloride other chlorides such as ferrous chloride may be mentioned as constituting an impurity, also ferrous and ferric sulphate and ferrous and ferric nitrate. I have already referred to organic matter which may be present either in a dissolved or suspended state in the solution as an impurity.

The general object of my invention is to provide a novel method by means of which these impurities may be removed at a minimum cost.

It also is an object of the invention to provide a method involving chemical reactions whereby such impurities as those above indicated may be more efficiently removed than by methods heretofore employed in practice.

In the manufacture of zinc chloride, metallic zinc, zinc skimmings, zinc spelter or the like is disolved in hydrochloric acid. Having been so dissolved the solution thus produced may be purified by the method invented by me and which I shall now proceed to describe.

The principle of my invention may be described or defined generally as consisting in the conversion of any ammonium chloride which may be present in the zinc chloride solution into ammonium nitrite which may be broken down into nitrogen gas and water by the application of heat to the solution to effect boiling thereof, during which oxidation of any iron salts which may be present is effected in the absence of free acid thereby producing insoluble iron oxide.

In order that the invention may be clearly understood I shall now give examples and describe in detail one or two methods embodying the invention which may be employed for the removal of certain of the impurities in question and which heretofore have been specifically mentioned.

In the practice of my invention commercially for the removal of impurities, such as ammonium chloride, ferric chloride and organic substances, I prefer to employ zinc nitrite as the chemical agent or substance to be added to the zinc chloride solution. In practice the zinc nitrite is added to the solution of zinc chloride, the latter having a concentration value preferably of 50° Baumé at ordinary room temperature ranging from 60° to 70° F. The addition of the nitrite is made at ordinary room temperature in order to prevent and avoid the breaking up of the nitrite or nitrous acid which may be formed therefrom before there is opportunity for the zinc nitrite to interact or react with the ammonium chloride to form ammonium nitrite. The requisite quantity of zinc nitrite is placed in a volume of zinc chloride in solution and is thoroughly dissolved and diffused therein. During this period the solution is agitated by stirring or otherwise and such agitation is continued until all visible reaction has been completed or has taken place. The zinc nitrite should be added in an amount sufficient to react with all of the impurities, including ammonium chloride, which may be present in the zinc chloride solution. For every gram of ammonium chloride which may be present I have obtained excellent results by the addition of 1.3868 grams of zinc nitrite. The amount of ammonium chloride which may be present may be determined by a quantitative analysis according to well known chemical methods.

Upon the addition of zinc nitrite to the zinc chloride solution the reactions which take place may be represented as follows:

$$Zn(NO_2)_2 + 2HCl = 2HNO_2 + ZnCl_2;$$

that is to say, the reaction between zinc nitrite and hydrochloric acid produces nitrous acid and zinc chloride.

The reaction continues as follows:

$$HNO_2 + NH_4Cl = NH_4NO_2 + HCl;$$

that is to say, the reaction between nitrous acid and ammonium chloride produces ammonium nitrite and hydrochloric acid.

As has been stated, the solution is stirred during these reactions and upon the completion of the reactions the solution is heated to a temperature above the decomposition temperature of the ammonium nitrite (about 180° F.) whereupon the ammonium nitrite breaks down and forms nitrogen gas ($N_2$) and water ($2H_2O$).

If the hydrogen ion concentration is relatively low, the iron salts which may be present, such as ferric chloride, are oxidized to ferric oxide and precipitated. The reaction resulting in such precipitation may be indicated as follows:

$$2FeCl_3 + 6HNO_2 = Fe_2O_3 + 6NO + 3Cl_2 + 3H_2O;$$

that is to say, the reaction between the nitrous acid and the ferric chloride during the boiling of the solution results in the formation of ferric oxide, nitric oxide gas, chlorine gas, and water. The ferric oxide thus produced precipitates as a solid and may be removed.

As will be apparent, the method as thus described results in effectively removing the ammonium chloride and iron salts from the zinc chloride solution. This desirable result is obtained without any harmful effect upon the zinc chloride solution and without any loss of the zinc chloride.

When the solution of zinc chloride is boiled as above described its temperature is above 212° F. The boiling point, as has been suggested already, increases as the degree of concentration or specific gravity increases. During the boiling of the said solution any organic matter which may be present is oxidized by the nitrites contained in the solution to form carbon dioxide which passes off as a gas. The reaction may be indicated as follows:

$$4HNO_2 + C = CO_2 + 4NO + 2H_2O.$$

The carbon dioxide ($CO_2$) and nitric oxide (NO) resulting from this reaction pass off as gases. Since nitrous acid is unstable its reaction with carbon may be expressed in more detail as follows:

$$2HNO_2 = H_2O + NO + NO_2;$$
$$C + 2NO_2 = CO_2 + 2NO;$$

that is to say, the nitrous acid breaks down into water, nitric acid and nitrogen dioxide, and the latter gives up oxygen to the carbon.

Instead of employing zinc nitrite as described above I may employ calcium nitrite which reacts with the hydrochloric acid present to produce nitrous acid and calcium chloride. The latter may be removed by treating the solution with zinc sulphate. The reactions may be indicated as follows:

$$Ca(NO_2)_2 + 2HCl = 2HNO_2 + CaCl_2;$$

that is to say, the calcium nitrite reacts with hydrochloric acid to produce nitrous acid and calcium chloride.

The reaction of the zinc sulphate which is thereafter added with calcium chloride may be indicated as follows:

$$ZnSO_4 + CaCl_2 = ZnCl_2 + CaSO_4;$$

that is to say, zinc sulphate reacts with calcium chloride to produce zinc chloride and calcium sulphate. The calcium sulphate thus produced is insoluble and separates out as a precipitate which may be removed.

The nitrous acid formed when calcium nitrite is used reacts as indicated in the first reaction with any iron salts, such as ferric chloride, which may be present to produce ferric oxide which separates out as a precipitate and may be removed. The reaction may be indicated as follows:

$$2FeCl_3 + 6HNO_2 = Fe_2O_3 + 6NO + 3Cl_2 + 3H_2O.$$

This reaction is the same as that given above for the removal of the ferric chloride when zinc nitrite is employed in the method.

It will be understood that each of the above formulæ indicates substantially the reaction which takes place in each instance. I have not attempted to describe in detail such intermediate or secondary reactions as may occur between the nitrous acid and the impurities which may be present in the solution. Such intermediate or secondary reactions are of the same or similar order as those which are outlined above in connection with the oxidation of carbon.

Any nitrite soluble in zinc chloride may be employed in the treatment of the latter for the removal of the impurities specified, namely ammonium chloride, iron chloride and organic matter, but some of these nitrites, for example, sodium and potassium nitrites, when used leave soluble salts in solution which render it unsuitable for use in the manufacture of vulcanized fibre, although the presence of such salts does not interfere with the use of the solution for many other purposes.

I have found in practice that by the employment of the method embodying my invention zinc chloride solutions may be freed from impurities such as those indicated at minimum cost and expense and that the removal of such impurities may be effected without loss of zinc chloride and without injury or detriment to the solution. A solution thus purified is most desirable for use in the treatment of sheets of cellulosic material particularly if the latter are to be used in the manufacture of vulcanized fibre, and such purified solution also is well adapted for use in connection with any other industrial process which may require the use of a zinc chloride solution free from impurities.

Having thus described my invention, what I claim and desire to secure by Letters Patent is:

1. The method of removing impurities from solutions of zinc chloride containing hydrochloric acid, which consists in introducing into a body of such solution a requisite quantity of a nitrite soluble therein, and after all visible reaction has taken place applying heat to such solution to raise the same to boiling temperature.

2. The method of removing impurities from solutions of zinc chloride containing hydrochloric acid, which consists in introducing into a body of such solution a requisite quantity of a nitrite soluble therein, agitating the same to effect complete dissolution and diffusion of the same therein, and thereafter applying heat to said solution to raise it to boiling temperature.

3. The method of treating solutions of zinc chloride containing hydrochloric acid for the removal of impurities therefrom, which consists in introducing thereinto a nitrite soluble therein and effecting reactions with any ammonium chloride which may be present therein to produce ammonium nitrite, and thereafter applying heat to the said solution to raise the same to the decomposition temperature of the ammonium nitrite to break down the said ammonium nitrite into nitrogen gas and water and to further raise the temperature to the boiling point to cause oxidation of any iron salts and organic matter which may be present therein to effect removal thereof from the solution.

4. The method of treating solutions of zinc chloride for the removal of impurities therefrom, which consists in generating nitrous acid therein, and thereafter raising the said solution to a temperature at which it boils to effect removal of impurities which may be present therein.

5. The method of treating solutions of zinc chloride for the removal of ammonium chloride therefrom, which consists in introducing thereinto zinc nitrite and effecting reaction of the same with the hydrochloric acid present to produce nitrous acid which reacts with the ammonium chloride which may be present to produce ammonium nitrite, and thereafter applying heat to raise the said solution to its boiling point and thereby causing oxidation of any iron salts and organic matter which may be present to effect removal thereof.

6. The method of treating a solution of zinc chloride for the removal therefrom of any ammonium chloride which may be present therein, which consists in effecting a reaction between a nitrite soluble in said solution and the hydrochloric acid present in said solution to produce nitrous acid which reacts with any ammonium chloride which may be present to produce ammonium nitrite and with any iron salts present to produce ferric oxide as a precipitate, and thereafter applying heat to the said solution to raise the same to the decomposition temperature of ammonium nitrite to break the said ammonium nitrite down to produce nitrogen and water, the former escaping as a gas, and thereafter removing the said precipitate.

7. The method of treating a solution of zinc chloride for the removal therefrom of impurities including any ammonium chloride which may be present therein, which consists in introducing into the said solution zinc nitrite in amount necessary to react with the said impurities which may be present, and effecting a reaction to produce nitrous acid which reacts with any ammonium chloride present to produce ammonium nitrite and also with any iron salts and organic substances present to oxidize the same, the said reaction with iron salts producing ferric oxide as a precipitate and with the organic substance producing carbon dioxide gas, thereafter applying heat to the solution to raise the same to a temperature above the decomposition temperature of ammonium nitrite to effect a breaking down thereof into nitrogen gas and water, and thereafter removing the said ferric oxide.

8. The method of treating a solution of zinc chloride containing hydrochloric acid to remove impurities therefrom, including ammonium chloride and other chlorides and organic matter, which comprises the introduction of zinc nitrite into said solution in an amount requisite for reaction with the said impurities, and thereafter applying heat to the said solution.

9. The method of treating a solution of zinc chloride for the removal of ammonium chloride containing hydrochloric acid, iron salts and organic matter which may be present therein, which comprises the introduction of an amount of a nitrite soluble in the zinc chloride necessary to completely interact with the ammonium chloride which may be present, and thereafter applying heat to said solution and ultimately raising the same to boiling temperature.

10. The method of treating a solution of zinc chloride for the removal therefrom of impurities, including ammonium chloride, which may be present therein, which consists in introducing into the said solution zinc nitrite in an amount sufficient to completely interact with such impurities as may be present and effecting a reaction to produce nitrous acid which reacts with any ammonium chloride present to produce ammonium nitrite, and thereafter applying heat to the solution to raise the same to a temperature above the decomposition temperature of ammonium nitrite to effect a breaking down thereof into nitrogen gas and water.

11. The method of treating a solution of zinc chloride to remove ammonium chloride therefrom, which consists in generating nitrous acid therein which reacts with the ammonium chloride which may be present to produce ammonium nitrite, and thereafter applying heat to the solution to raise its temperature sufficiently to decompose the ammonium nitrite into nitrogen and water.

12. The method of treating a solution of zinc chloride for the removal of ammonium chloride and iron salts therefrom, which consists in generating nitrous acid therein which reacts with the ammonium chloride which may be present to form ammonium nitrite, applying sufficient heat to said solution to effect the decomposition of the ammonium nitrite into nitrogen and water, and thereafter boiling the said solution to cause the oxidation of the iron salts which may be present, thereby forming a precipitate of iron oxide, and thereafter removing said precipitate.

13. The method of treating a solution of zinc chloride for the removal of ammonium chloride, iron salts and organic matter therefrom, which consists in generating nitrous acid therein which reacts with the ammonium chloride which may be present to form ammonium nitrite, applying sufficient heat to the solution to decompose the ammonium nitrite into nitrogen and water and thereafter boiling said solution to cause the iron salts which may be present to be oxidized and precipitated as iron oxides, and to cause said organic matter to be oxidized to carbon which carbon is subsequently oxidized to carbon dioxide and escapes as a gas, and thereafter removing the said precipitate of iron oxide.

14. The method of treating a solution of zinc chloride to remove iron salts therefrom, which consists in generating nitrous acid in the said solution, applying heat to the said solution to raise its temperature above the boiling point thereby causing the oxidation of the iron salts to produce insoluble iron oxide, and thereafter removing said insoluble oxide.

15. The method of treating a solution of zinc chloride for the removal of organic matter therefrom, which consists in generating nitrous acid therein and boiling said solution to cause the organic matter to be oxidized to carbon, which is subsequently oxidized to produce carbon dioxide which escapes as a gas.

16. The method of treating a solution of zinc chloride to remove ammonium chloride therefrom, which comprises the introduction of zinc nitrite into said solution in an amount requisite for reaction with the amount of ammonium chloride which may be present, and thereafter applying heat to the solution.

In testimony that I claim the foregoing as my invention, I have hereunto signed my name this 8th day of April, 1927.

JAMES L. McCLELLAN.